(12) United States Patent
Kawamoto et al.

(10) Patent No.: US 10,224,860 B2
(45) Date of Patent: Mar. 5, 2019

(54) CONTROL DEVICE FOR ROTARY ELECTRICAL MACHINE AND CONTROL METHOD

(71) Applicant: Mitsubishi Electric Corporation, Tokyo (JP)

(72) Inventors: Hideaki Kawamoto, Tokyo (JP); Noriyuki Wada, Tokyo (JP); Taisuke Iwakiri, Tokyo (JP); Takuya Miyanaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/784,608

(22) Filed: Oct. 16, 2017

(65) Prior Publication Data

US 2018/0115270 A1  Apr. 26, 2018

(30) Foreign Application Priority Data

Oct. 20, 2016  (JP) .................... 2016-206170

(51) Int. Cl.
*H03K 5/00* (2006.01)
*H02P 29/024* (2016.01)
(Continued)

(52) U.S. Cl.
CPC .......... *H02P 29/0243* (2016.02); *B60L 3/003* (2013.01); *H02H 3/13* (2013.01);
(Continued)

(58) Field of Classification Search
CPC ..... H02K 11/33; H02P 2006/045; H02P 6/04; H02H 3/13
See application file for complete search history.

(56) References Cited

U.S. PATENT DOCUMENTS

2006/0007615 A1   1/2006  Ochiai et al.
2011/0241589 A1  10/2011  Danjo et al.
2015/0236625 A1*  8/2015  Cho .................... H02P 6/04
                                         318/400.15

FOREIGN PATENT DOCUMENTS

DE  102016200241 A1  7/2016
JP       4968698 B2  7/2012

OTHER PUBLICATIONS

Communication dated May 17, 2018 from the German Patent and Trademark Office in counterpart application No. 102017217709.8.

* cited by examiner

*Primary Examiner* — Karen Masih
(74) *Attorney, Agent, or Firm* — Sughrue Mion, PLLC; Richard C. Turner

(57) ABSTRACT

The control device for a rotary electrical machine which is connected between a DC power source and a rotary electrical machine and which controls driving of the rotary electrical machine by converting DC power from the DC power source into AC power, includes a power conversion circuit which is configured from a plurality of switching elements, a phase current detection unit which detects phase currents in the rotary electrical machine, a phase current ratio derivation unit which derives a ratio in which the phase currents detected by the phase current detection unit are equal to or greater than a reference value, or equal to or lower than the reference value, and an element fault determination unit which determines a fault status of each of the switching elements when the ratio derived by the phase current ratio derivation unit is equal to or greater than a previously established ratio threshold value.

9 Claims, 15 Drawing Sheets

(51) Int. Cl.
*B60L 3/00* (2019.01)
*H02H 3/13* (2006.01)
*H02P 27/06* (2006.01)

(52) U.S. Cl.
CPC ........... *H02P 27/06* (2013.01); *B60L 2210/40* (2013.01); *B60L 2240/429* (2013.01)

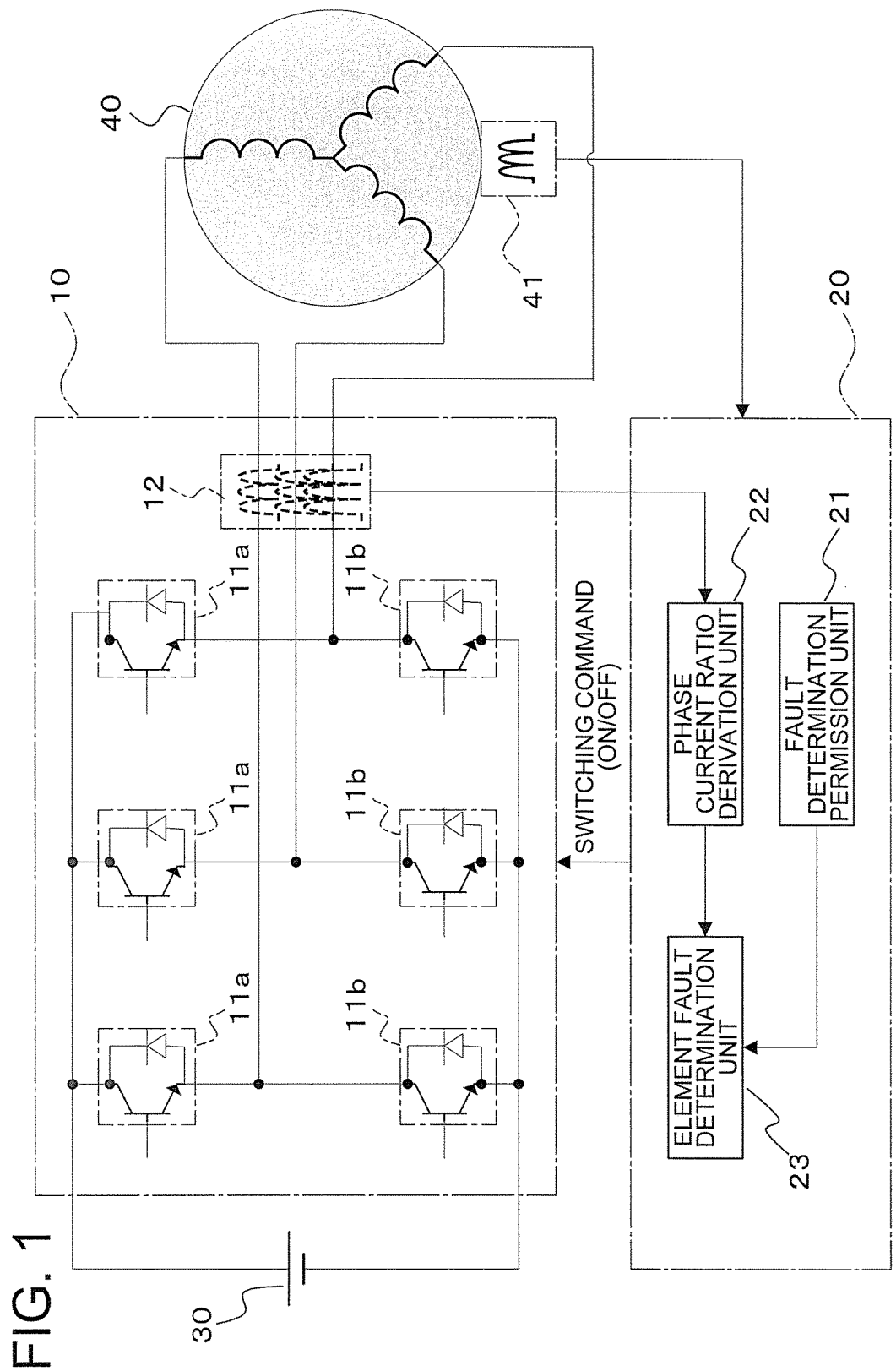

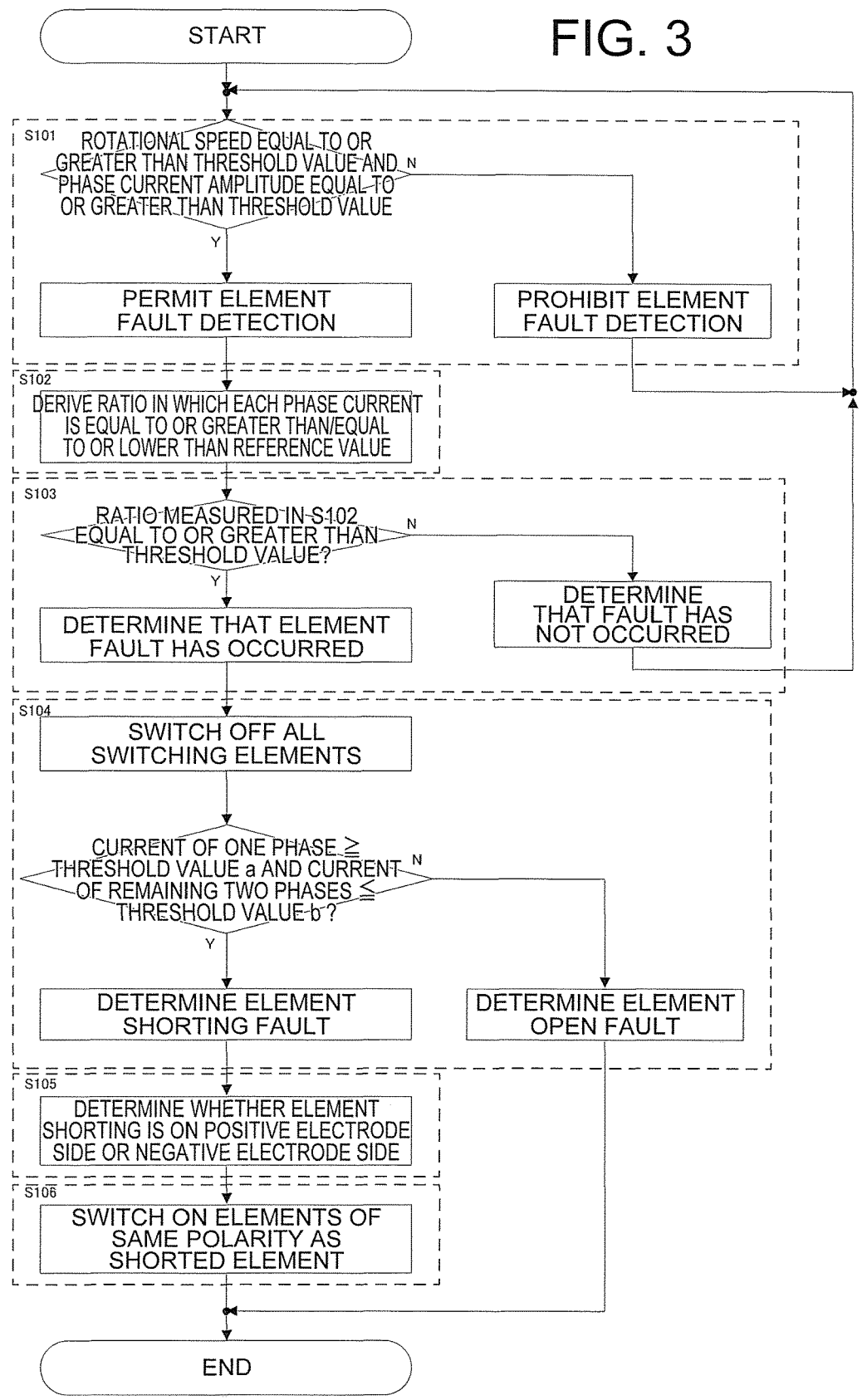

CONTROL DEVICE FOR ROTARY ELECTRICAL MACHINE AND CONTROL METHOD

BACKGROUND OF THE INVENTION

1. Field of the Invention

This invention relates to a control device and control method for a rotary electrical machine which is used in a vehicle, for example, and receives a supply of electrical power from a DC power source via an inverter including switching elements.

2. Description of the Related Art

In the prior art, there is known a control device for a rotary electrical machine which receives a supply of electrical power from a DC power source via a three-phase inverter in which a switching section including switching elements and freewheeling diodes connected in parallel to the switching elements is provided on a positive electrode side and a negative electrode side of an arm of each phase, the control device being provided with a phase current detection unit configured from three sensors which detect the currents of the respective phases flowing between the inverter and the rotary electrical machine, a DC component derivation unit which derives the DC components of the three-phase currents, and a shorting fault determination unit which determines that a shorting fault has occurred in a switching element, when at least two of the DC components of the three-phase currents derived by the DC component derivation unit have exceeded a threshold value (see, for example, Japanese Patent No. 4968698).

This device utilizes the fact that the DC components of the currents of the respective phases, in other words, the average values thereof, are 0 A if there is no fault in any of the components in the inverter, and if a DC component is equal to or greater than a threshold value, then it is determined that a shorting fault has occurred in a switching element.

SUMMARY OF THE INVENTION

However, in Japanese Patent No. 4968698, the rotary electrical machine used to drive a vehicle experiences rapid variations in rotation and torque, depending on the driving conditions. When the rotation or torque varies rapidly, then the DC components of the currents of the respective phases are offset from 0 A. Furthermore, when noise having a large amplitude occurs in the phase current detection path, then the DC components are offset. Therefore, if the DC components of the currents of the respective phases are used, then there is a risk of erroneous determination of a shorting fault in a switching element, as a result of the offset.

In this case, it is possible to resolve the problem of erroneous determination of a shorting fault in a switching element as a result of an offset, by installing an element shorting determination circuit in the switching elements of the inverter, but there is a problem in that it is not possible to determine a fault in the element shorting determination circuit itself.

This invention was devised in order to resolve the above-mentioned problems, an object thereof being to obtain a control device and a control method for a rotary electrical machine whereby a fault status of the switching element can be determined with high accuracy.

The control device for a rotary electrical machine according to this invention is a control device for a rotary electrical machine which is connected between a DC power source and a rotary electrical machine and which controls driving of the rotary electrical machine by converting DC power from the DC power source into AC power, the control device including: a power conversion circuit which is configured from a plurality of switching elements; a phase current detection unit which detects phase currents in the rotary electrical machine; a phase current ratio derivation unit which derives a ratio in which the phase currents detected by the phase current detection unit are equal to or greater than a reference value, or equal to or lower than the reference value; and an element fault determination unit which determines a fault status of each of the switching elements when the ratio derived by the phase current ratio derivation unit is equal to or greater than a previously established ratio threshold value.

The control method for a rotary electrical machine according to this invention is a control method for a rotary electrical machine achieved by a control device for a rotary electrical machine which is connected between a DC power source and a rotary electrical machine and which controls driving of the rotary electrical machine by converting DC power from the DC power source into AC power, the control method including: a phase current detection step for detecting phase currents in the rotary electrical machine; a phase current ratio derivation step for deriving a ratio in which the phase currents detected in the phase current detection step are equal to or greater than a reference value, or equal to or lower than the reference value; and an element fault determination step for determining a fault status of each of switching elements configuring a power conversion circuit when the ratio derived in the phase current ratio derivation step is equal to or greater than a previously established ratio threshold value.

According to the control device and control method for a rotary electrical machine according to this invention, the phase currents of a rotary electrical machine are detected, the ratio in which the detected phase currents are equal to or greater than a reference value, or equal to or lower than the reference value, is derived, and a fault status of each of the switching elements configuring the power conversion circuit is determined if the derived ratio is equal to or greater than a previously established ratio threshold value.

Therefore, it is possible to determine a fault status of the switching element with high accuracy.

BRIEF DESCRIPTION OF THE DRAWINGS

FIG. 1 is a schematic drawing illustrating a control device for a rotary electrical machine according to a first embodiment of the present invention, together with a DC power source and the rotary electrical machine;

FIG. 3 is a flowchart which shows a fault determination process in the control device for the rotary electrical machine according to the first embodiment of the invention;

DESCRIPTION OF THE PREFERRED EMBODIMENTS

Figure 2A:
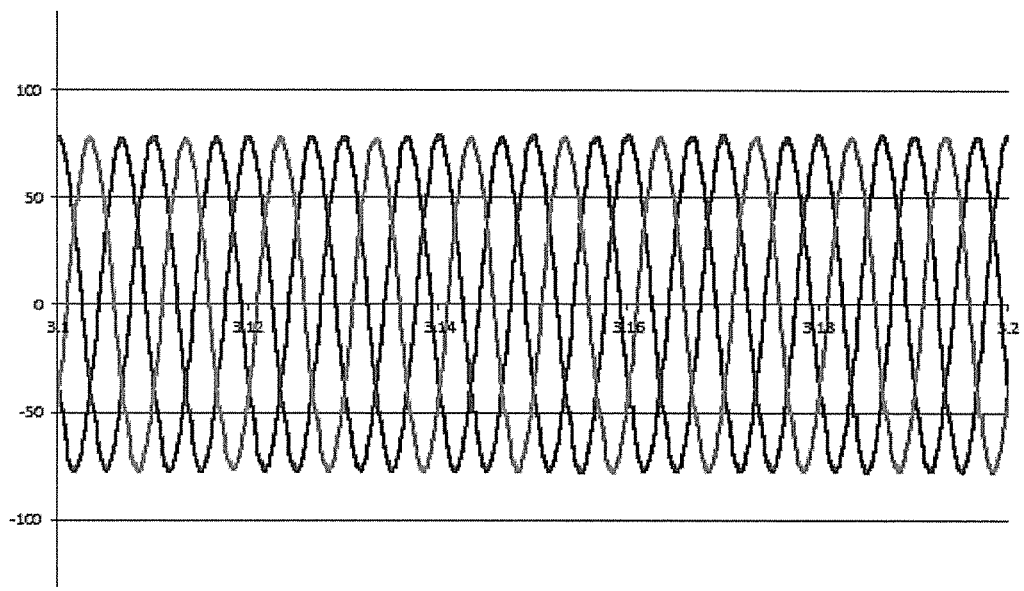
FIGS. 2A to 2C are illustrative diagrams showing the currents flowing in the rotary electrical machine, in a normal case and in the event of a fault.

Below, a preferred embodiment of a control device and control method for a rotary electrical machine according to the invention is described with reference to the drawings, and parts which are the same or corresponding are labelled with the same reference numerals in the drawings.

First Embodiment

FIG. 1 is a schematic drawing illustrating a control device for a rotary electrical machine according to a first embodiment of the present invention, together with a DC power source and the rotary electrical machine. In FIG. 1, the control device for a rotary electrical machine according to the first embodiment of this invention is constituted by an inverter 10 and an inverter control unit 20.

The inverter 10 converts DC power from the DC power source 30 to AC power and supplies same to the rotary electrical machine 40, as well as converting AC power from the rotary electrical machine 40 to DC power and supplying same to the DC power source 30. Furthermore, a rotational speed detection unit 41 which detects the rotational speed of the rotary electrical machine 40 is provided in the rotary electrical machine 40.

This first embodiment of the invention is described with respect to an example in which the rotary electrical machine 40 is a three-phase AC motor. A permanent magnet-type of three-phase AC synchronous motor, or a three-phase brushless motor, for example, is used as the three-phase AC motor. Furthermore, since the rotary electrical machine 40 is a three-phase AC motor, then the inverter 10 is described as being a three-phase inverter.

The inverter 10 has a power conversion circuit formed of switching elements 11 of respective phases which are connected between DC bus lines on a power input side and a phase current detection unit 12 which detects the currents of respective phases in the rotary electrical machine 40 which flow in the AC bus line. Furthermore, the inverter 10 achieves conversion between direct current and alternating current, by switching the switching elements 11 on and off in accordance with a switching command from the inverter control unit 20.

In the switching elements 11, the positive electrode-side switching elements 11*a* and the negative electrode-side switching elements 11*b* corresponding to each of the phases, the U phase, V phase and W phase, are connected mutually in series and are connected in parallel to the DC power source 30.

Furthermore, the center point between the positive electrode-side switching element 11*a* and the negative electrode-side switching element 11*b* of the U phase is connected to the U-phase input of the rotary electrical machine 40, the center point between the positive electrode-side switching element 11*a* and the negative electrode-side switching element 11*b* of the V phase is connected to the V-phase input of the rotary electrical machine 40, and the center point between the positive electrode-side switching element 11*a* and the negative electrode-side switching element 11*b* of the W phase is connected to the W-phase input of the rotary electrical machine 40.

The rotary electrical machine 40 rotates or stops depending on the sum torque of the torque induced in the rotary electrical machine 40 by the currents of the respective phases, and a load torque which is applied externally.

The first embodiment of the invention is described here with respect to an example of the three-phase AC rotary electrical machine 40 and the three-phase inverter 10, but the invention can be applied to an AC rotary electrical machine and an inverter having phases other than three phases. Furthermore, the DC power source 30, provided that it is capable of supplying DC power, may have adopt any mode, such as a power storage device, a switching power source, a DC-DC converter, or the like.

Furthermore, with regard to the switching elements 11, although transistors are illustrated in FIG. 1, there is no restriction of the type of switching element used, for example, a metal oxide semiconductor field effect transistor (MOSFET), insulated gate bipolar transistor (IGBT), etc.

Furthermore, a freewheeling diode is connected in parallel with each of the transistors of the switching elements 11, with the direction from the negative electrode side to the positive electrode side of the DC power source 30, in other words, the direction from the lower level side to the upper level side, as the forward direction.

The inverter control unit 20 monitors the currents of each phase in the rotary electrical machine 40 which are detected by the phase current detection unit 12, and outputs a command for driving the switching elements 11 by pulse width modulation (PWM) in such a manner that the phase currents become a desired current. In this case, if all of the switching elements 11 are normal and the rotary electrical machine 40 is rotating, then an AC current flows in each phase.

Furthermore, the inverter control unit 20 has a fault determination permission unit 21, a phase current ratio derivation unit 22 and an element fault determination unit 23. The fault determination permission unit 21 permits determination of faults in the switching elements 11 on the basis of the speed of rotation of the rotary electrical machine 40 which is detected by the rotational speed detection unit 41, and the currents of each phase in the rotary electrical machine 40 which are detected by the phase current detection unit 12.

The phase current ratio derivation unit 22 derives the ratio in which the currents of each phase are equal to or greater than, or equal to or lower than, a reference value, on the basis of the currents of each phase in the rotary electrical machine 40 detected by the phase current detection unit 12. The element fault determination unit 23 determines that a switching element 11 is in a fault status when the ratio derived by the phase current ratio derivation unit 22 is equal to or greater than a previously established ratio threshold value.

Below, the fault determination process in the control device for a rotary electrical machine having the configuration described above will be described. Firstly, the phase current waveform when a fault has occurred in a switching element 11 is described. If the inverter 10 is operating normally without a fault and the rotary electrical machine 40 is rotating, then the current of each phase is a sinusoidal wave centered on 0 A, as illustrated in FIG. 2A. In this case, if 0 A is set as the reference value, then the ratio in which the currents of each phase are equal to or greater than the reference value is effectively 50%.

Figure 2B:
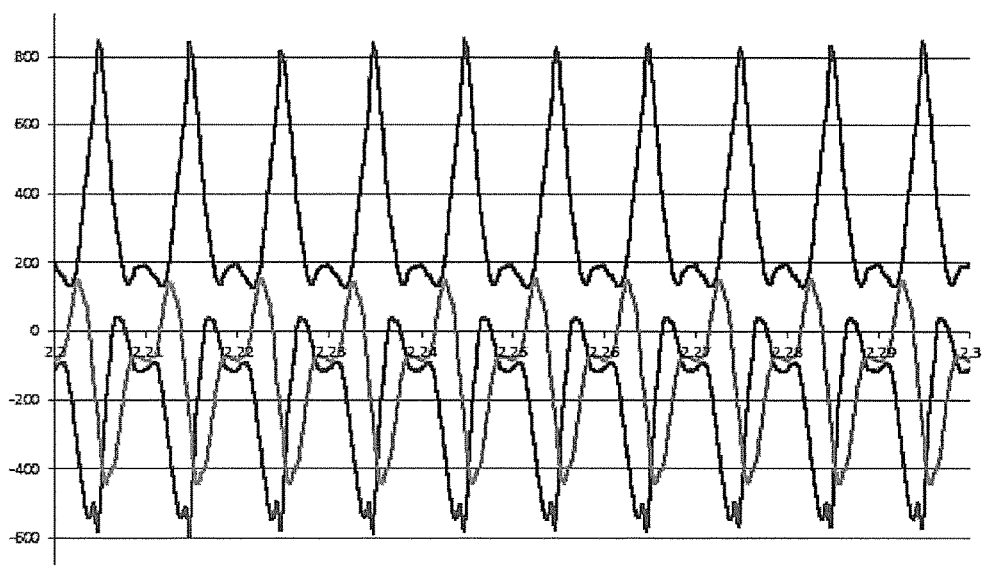
Figure 2C:
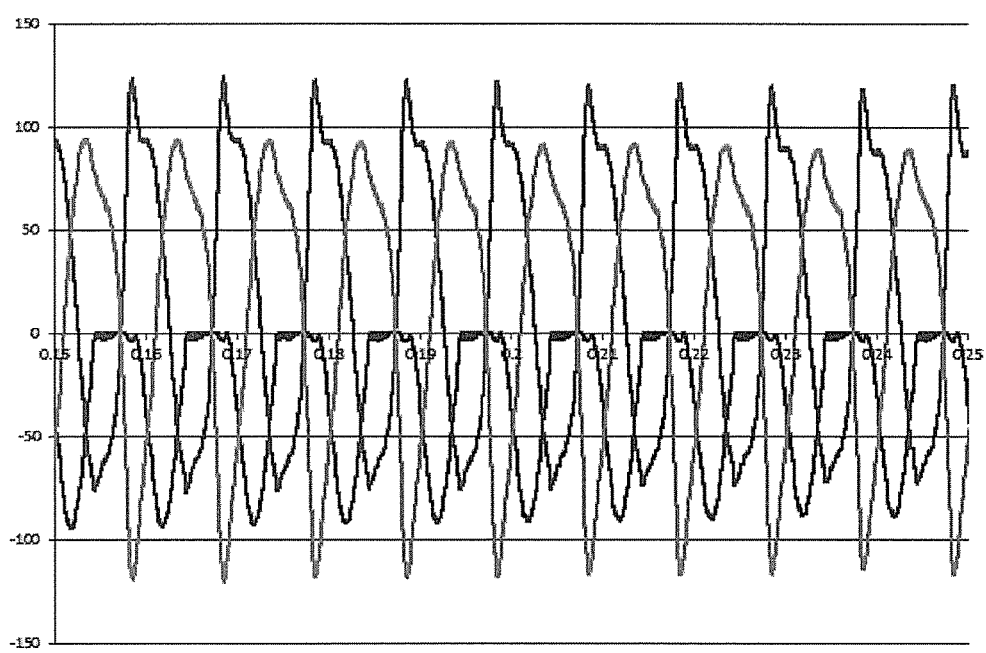

On the other hand, if a shorting fault has occurred in one of the switching elements 11, then the current of each phase is as illustrated in FIG. 2B, and if an open fault has occurred in one of the switching elements 11, then the current of each phase is as illustrated in FIG. 2C. In this case, if 0 A is set as the reference value, then the ratio in which the phase currents are equal to or greater than the reference value is effectively 100% in the direction of either the positive electrode side or negative electrode side, in the particular phase.

Therefore, in the first embodiment of the invention, the phase current waveform in the event of a fault in a switching element 11 described above is utilized to determine a fault in a switching element 11, by the procedure indicated in the flowchart in FIG. 3 which shows the fault determination process of the control device for a rotary electrical machine according to the first embodiment of the present invention.

In FIG. 3, firstly, in step S101, the fault determination permission unit 21 receives the rotational speed of the rotary electrical machine 40 which is detected by the rotational speed detection unit 41, and the currents of the respective phases in the rotary electrical machine 40 which are detected by the phase current detection unit 12, and permits determination of faults in the switching elements 11 if the rotational speed and the amplitudes of the phase currents are equal to or greater than respective threshold values.

With regard to the threshold values for permitting determination of faults in the switching elements 11, the method for determining the threshold value for the rotational speed is described below in terms of a trade-off with the ratio derivation cycle, and the method for determining the threshold value for the phase current amplitude is described here. More specifically, the threshold value for the phase current amplitude is determined by taking account of the error in the phase current detection unit 12 and the control performance of the inverter control unit 20.

Figure 4A:
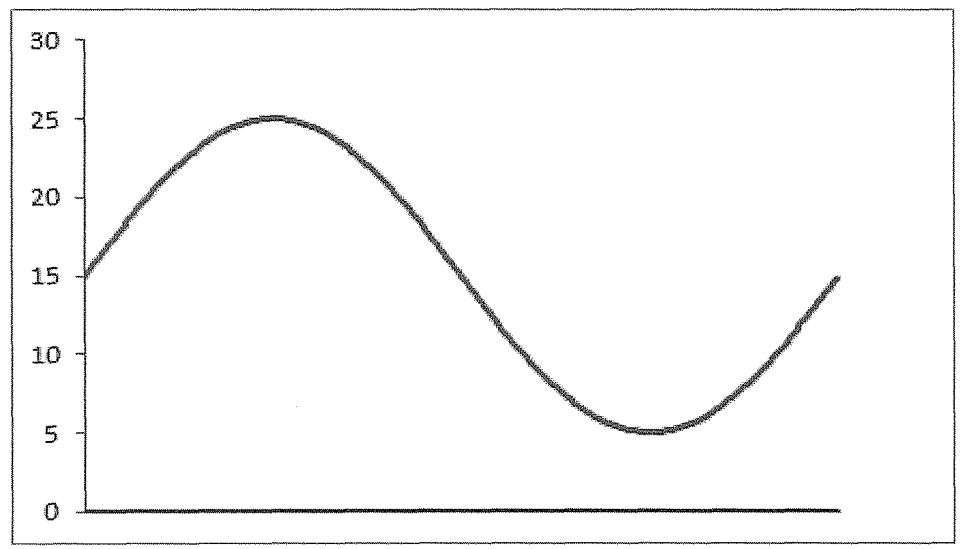
FIGS. 4A and 4B are reference diagrams for illustrating a method for determining a phase current amplitude threshold value in the control device for the rotary electrical machine according to the first embodiment.

For example, if the DC error is 15 A, then as illustrated in FIG. 4A, even if a fault has not occurred, the ratio in which the phase current is equal to or greater than a reference value of 0 A is 100%, when the phase current amplitude is 15 A or lower.

Figure 4B:
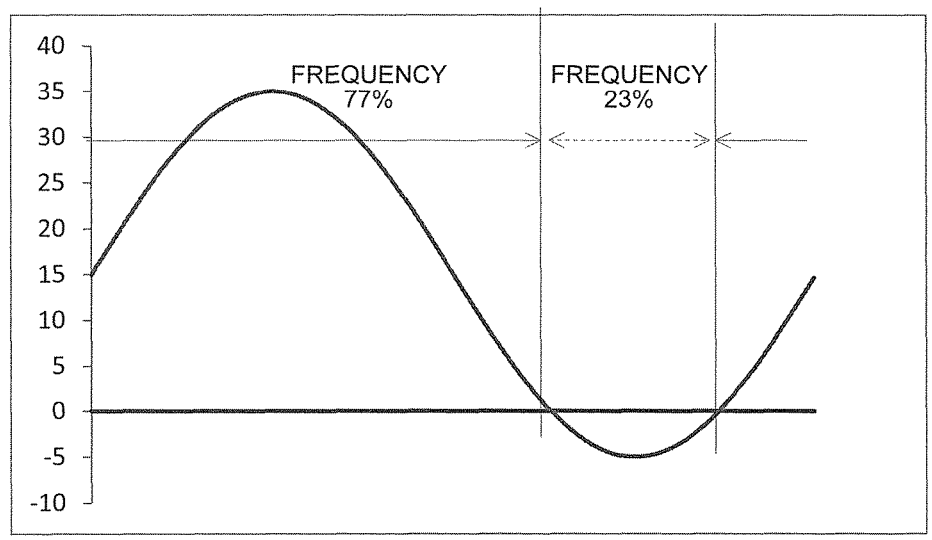

On the other hand, if the phase current amplitude is 20 A, then as illustrated in FIG. 4B, the ratio in which the phase current is equal to or greater than a reference value of 0 A is 77%. Therefore, the fault determination permission unit 21 sets the threshold value for the phase current amplitude to 20 A, and permits the determination of faults in the switching elements 11 when the phase current amplitude is equal to or greater than 20 A.

Subsequently, when determination of faults in the switching elements 11 is permitted, than in step S102, the phase current ratio derivation unit 22 derives the ratio in which the currents of each phase are equal to or greater than, or equal to or lower than, the reference value. In this case, the derivation of the phase current ratio requires the phase current to be measured for at least one cycle of the electrical angle.

The phase current has a period that is directly proportional to the rotational speed of the rotary electrical machine 40, and therefore, when the rotary electrical machine 40 rotates at high speed, the phase current waveform has a shorter period than when rotating at low speed. Therefore, if the ratio is derived for each cycle of the electrical angle of the phase current, the ratio derivation interval becomes shorter and the processing load becomes higher, the faster the rotational speed, and consequently, the ratio of the phase current should be updated at a fixed cycle.

The ratio derivation cycle may be determined by taking the following trade-off into consideration. More specifically, a first consideration is the processing load, a second consideration is a rotational speed lower limit, and a third consideration is the time from the occurrence of a fault until determination of the fault.

Here, the processing load becomes higher, the shorter the ratio determination cycle. Furthermore, with regard to the rotational speed lower limit, the shorter the ratio derivation cycle, then the less possible it becomes to make a determination during low-speed rotation, since measurement for one cycle or more of the electrical angle becomes impossible. Moreover, with regard to the time from the occurrence of a fault to determination of the fault, the longer the ratio derivation cycle, the longer the time taken for determination.

Figure 5A:
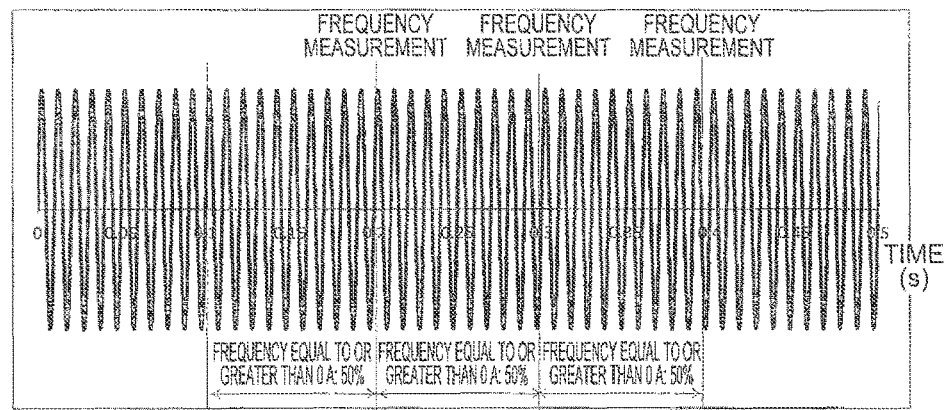
FIGS. 5A to 5C are reference diagrams for illustrating a method for determining a rotational speed threshold value in the control device for a rotary electrical machine according to the first embodiment.
Figure 5B:
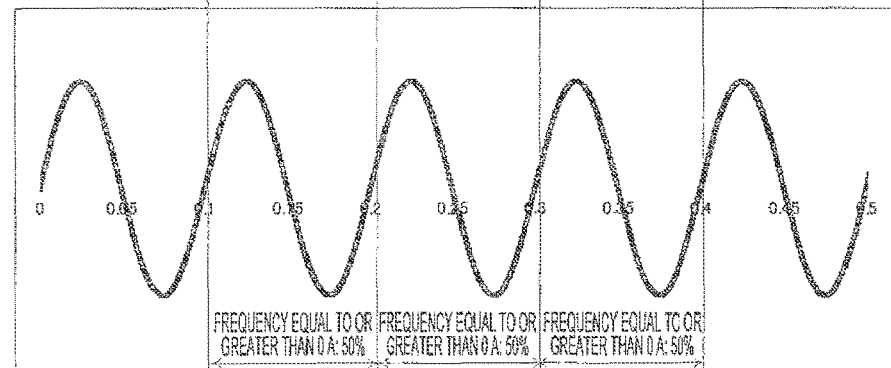

For example, in a case where the rotary electrical machine 40 is a permanent magnet-type synchronous motor having magnets of 12 poles, if the ratio derivation cycle is set to 100 ms, then when the rotational speed is 1000 r/min, the ratio during 10 cycles of the electrical angle can be derived, as illustrated in FIG. 5(A). Furthermore, when the rotational speed is 100 r/min, then as illustrated in FIG. 5(B), it is possible to derive the ratio during one cycle of the electrical angle.

Figure 5C:
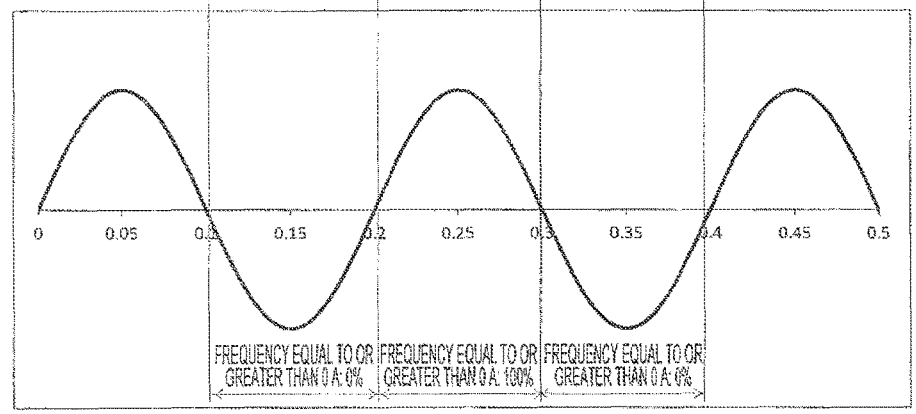

On the other hand, when the rotational speed is 50 r/min, then as illustrated in FIG. 5(c), the ratio for only 0.5 of the cycle of the electrical angle can be derived, and it is not possible to derive an accurate ratio. Therefore, in the example in FIG. 5(C), even if no fault has occurred in the switching elements 11, the ratio in which the phase current is equal to or greater than, or equal to or lower than, the reference value of 0 A is determined to be 100%. Therefore, the fault determination permission unit 21 sets the rotational speed threshold value to a rotational speed lower limit.

Next, when deriving the phase current ratio, in step S103, the element fault determination unit 23 determines that a fault has occurred in a switching element 11 if the ratio derived by the phase current ratio derivation unit 22 is equal to or greater than a ratio threshold value.

In this case, as described above, if a fault has occurred in a switching element 11, then the ratio in which the phase currents are equal to or greater than, or equal to or lower than, the reference value of 0 A is effectively 100%, but in actual practice, it is necessary to adjust the relationship between the reference value and the ratio threshold value to take account of error in the phase current detection unit 12. Therefore, a setting such as the following is adopted, for example: "fault determined if ratio of −10 A or more (less than 10 A) is equal to or greater than 95%".

Subsequently, when it is determined that a fault has occurred in the switching elements 11, in step S104, the element fault determination unit 23 determines whether the fault that has occurred is a shorting fault or an open fault.

Here, the element fault determination unit 23 switches all of the switching commands off when it is determined that a fault has occurred, since the currents of the respective phases when all of the switching commands are switched off is different, depending on whether the fault that has occurred is a shorting fault or an open fault.

More specifically, if the fault that has occurred is an open fault and the voltage of the DC power source 30 is higher than the voltage induced by the rotation of the rotary electrical machine 40, then current does not flow in each phase.

Figure 6A:
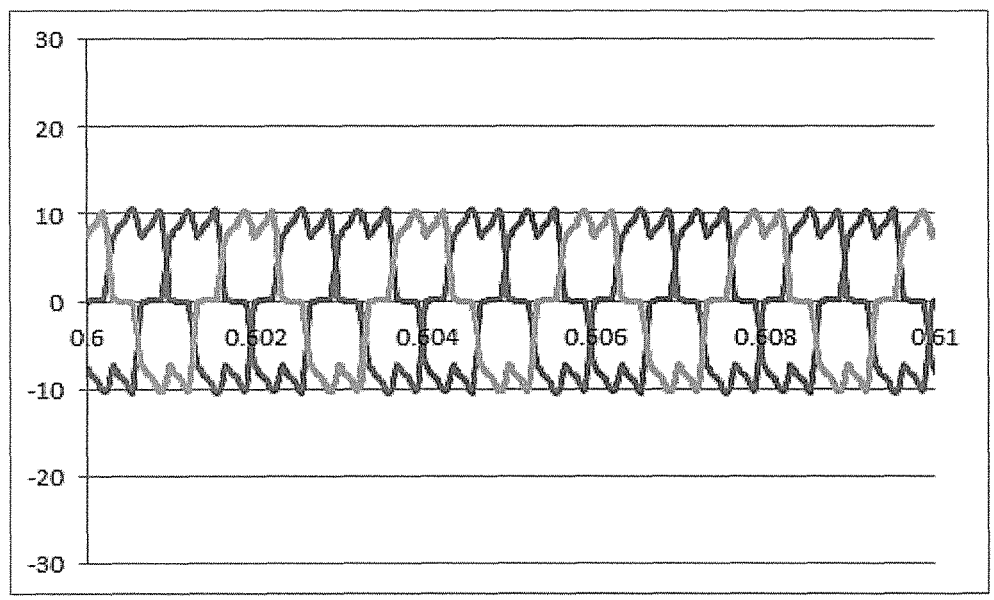
FIGS. 6A and 6B are illustrative diagrams showing the current flowing in the rotary electrical machine, when the fault in a switching element is an open fault.
Figure 6B:
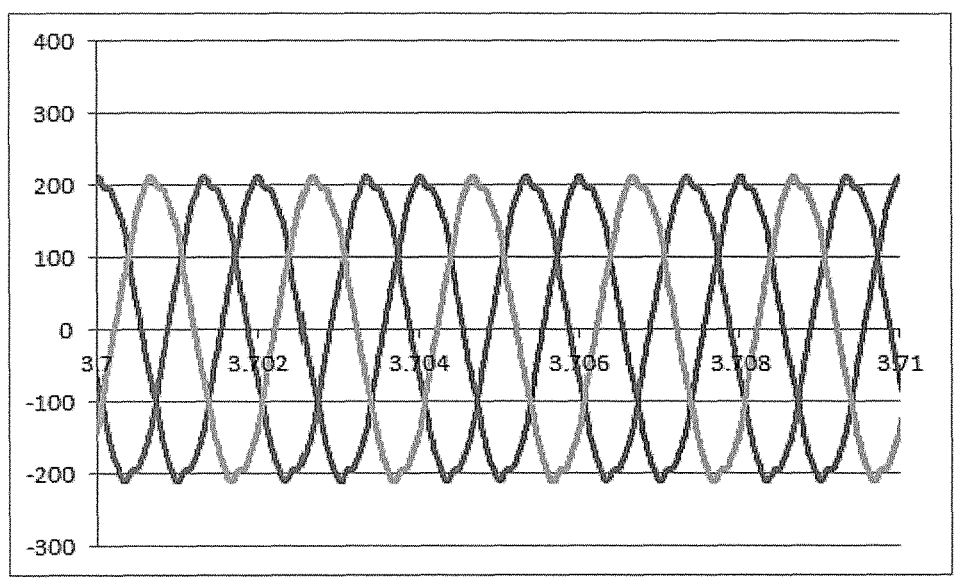

On the other hand, if the fault that has occurred is an open fault and the voltage of the DC power source 30 is lower than the voltage induced by the rotation of the rotary electrical machine 40, then a full-wave rectification circuit is formed by each of the freewheeling diodes of the switching elements 11, and as illustrated in FIGS. 6A and 6B, symmetrical currents flow in each phase.

FIG. 6A shows a case where the voltage difference between the induced voltage in the rotary electrical machine 40 and the voltage of the DC power source 30 is smaller and FIG. 6B shows a case where the voltage difference between the induced voltage in the rotary electrical machine 40 and the voltage of the DC power source 30 is large. In FIG. 6A, although there is a moment in which current does not flow, symmetrical currents flow in each of the phases.

Figure 7A:
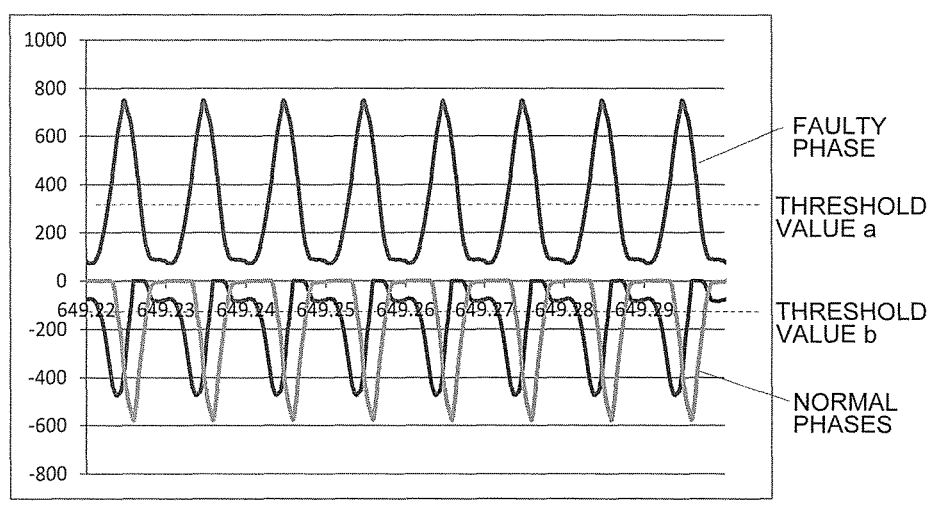
FIGS. 7A and 7B are illustrative diagrams showing the current flowing in the rotary electrical machine, when the fault in a switching element is a shorting fault.
Figure 7B:
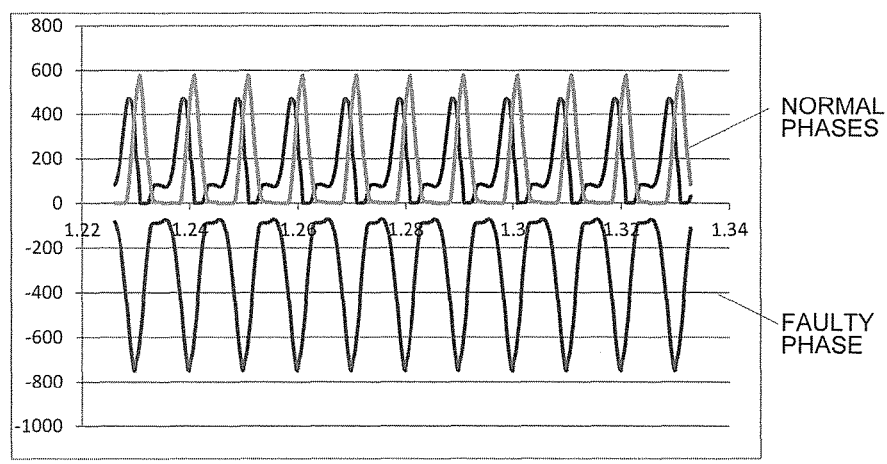

Furthermore, if the fault that has occurred is a shorting fault, then current flows in a uniform direction, as illustrated in FIGS. 7A and 7B. In this case, the orientation of the flowing current is reversed, between the phase where a fault has occurred and the normal phases.

Therefore, this phenomenon is utilized, and it is determined that the fault that has occurred is a shorting fault, when the phase current of a particular phase is equal to or greater than a threshold value a, and when the phase currents of the remaining phases flowing in an opposite direction to the phase current of the particular phase are equal to or greater than a threshold value b. In this respect, the current flowing in the phase where a fault has occurred is the sum of the currents flowing in the normal phases, and therefore the threshold values should be set to threshold value b=threshold value a÷number of normal phases. Furthermore, the threshold value a should be greater than the current that flows due to the full-wave rectification.

If the inverter 10 is a single-phase inverter, then it is determined that a fault that has occurred is a shorting fault, when the phase current detected by the phase current detection unit 12 is flowing at or above a previously established threshold value.

Next, if the fault that has occurred is determined to be a shorting fault, then in step S105, the element fault determination unit 23 determines whether the shorting fault that has occurred has arisen in a positive electrode-side switching element 11a or has arisen in a negative electrode-side switching element 11b.

More specifically, if the switching element 11 in which a shorting fault has occurred is a positive electrode-side switching element 11a, then the phase current waveform is as illustrated in FIG. 7A, and if the switching element 11 in which a shorting fault has occurred is a negative electrode-side switching element 11b, then the phase current waveform is as illustrated in FIG. 7B. From this, it is possible to determine whether the switching element 11 suffering the fault is on the positive electrode side or the negative electrode side, on the basis of the direction of the current that is flowing at or above the threshold value a.

Figure 8:
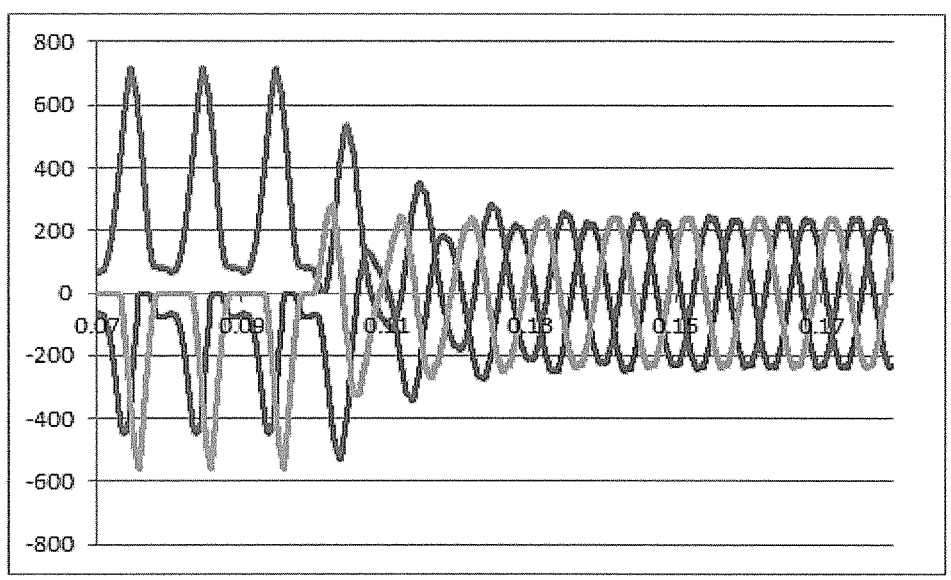
FIG. 8 is an illustrative diagram which shows the effects of the fault determination process in the control device for the rotary electrical machine according to the first embodiment of the invention.

Consequently, if it is determined that the shorting fault that has occurred is on the positive electrode side or the negative electrode side, then in step S106, the element fault determination unit 23 switches on the normal switching elements 11 which are of the same polarity as the switching element 11 suffering the shorting fault. Consequently, a three-phase shorted state occurs and the current peak value decreases, as illustrated in FIG. 8.

As described above, according to the first embodiment, a control device for a rotary electrical machine which is connected between a DC power source and a rotary electrical machine and which controls driving of the rotary electrical machine by converting DC power from the DC power source into AC power, is provided with a power conversion circuit which is configured from a plurality of switching elements, a phase current detection unit which detects phase currents in the rotary electrical machine, a phase current ratio derivation unit which derives a ratio in which the phase currents detected by the phase current detection unit are equal to or greater than a reference value, or equal to or lower than the reference value, and an element fault determination unit which determines a fault status of each of the switching elements when the ratio derived by the phase current ratio derivation unit is equal to or greater than a previously established ratio threshold value.

Therefore, it is possible to determine a fault status of the switching element with high accuracy.

Furthermore, by the configuration described above, it is possible to determine an element fault simply by means of the basic configuration for driving the rotary electrical machine 40, and an additional sensor is not necessary. In other words, in Japanese Patent No. 4968698, the DC components of the phase currents are used to carry out fault determination, and therefore it is necessary to extract the DC components. On the other hand, according to the first embodiment of the invention, the phase currents are used directly in the form of AC currents to determine a fault, by the ratio in which the phase currents are equal to and greater than, or equal to and lower than, the threshold value.

Consequently, since there is no need to extract the DC components, then it is possible to reduce the processing load compared to Japanese Patent No. 4968698. Furthermore, in Japanese Patent No. 4968698, the DC component is affected by the factor "noise superimposition time×noise amplitude", whereas in the first embodiment of the invention, it is possible to improve the resistance to noise since the phase current ratio is only affected by "noise superimposition time".

Furthermore, in Japanese Patent No. 4968698, it is only possible to determine an element shorting fault, whereas in the first embodiment of the invention, it is also possible to determine an element open fault. Furthermore, in Japanese Patent No. 4968698, it is only possible to determine a fault when all of the switching elements are off, whereas in the first embodiment of this invention, it is possible to determine a fault while the switching elements are being driven by PWM. The condition that fault determination is possible when all of the switching elements are off is limited to cases where the element fault is a shorting fault and the rotational speed is equal to or greater than a prescribed value.

Furthermore, the element fault determination unit 23 determines a fault status of the switching element 11 at a fixed cycle. Therefore, it is possible to reduce the processing load when the rotary electrical machine 40 is rotating at high speed, compared to when faults are determined for each rotation cycle.

Furthermore, the fault determination permission unit 21 permits determination of faults by the element fault determination unit 23 when the rotational speed of the rotary electrical machine 40 is equal to or greater than a previously established rotational speed threshold value. Consequently, it is possible to reduce the determination cycle by avoiding the determination of faults when the rotational speed is equal to or lower than the rotational speed threshold value.

Furthermore, the fault determination permission unit 21 permits determination of faults by the element fault determination unit 23 when the amplitude of the phase currents detected by the phase current detection unit 12 is equal to or greater than a previously established phase current amplitude threshold value. Consequently, it is possible to prevent erroneous determination of a fault due to detection error of the phase current detection unit 12.

Furthermore, when a switching element 11 positioned on the positive electrode side of the DC power source 30 has a shorting fault, the element fault determination unit 23 switches on the normal switching elements 11 which are of the same polarity as the switching element 11 suffering the shorting fault, and when a switching element 11 positioned on the negative electrode side of the DC power source 30 has a shorting fault, the element fault determination unit 23 switches on the normal switching elements 11 which are of the same polarity as the switching element 11 suffering the shorting fault. Consequently, it is possible to reduce the AC current peak value in a three-phase shorted state.

Second Embodiment

Figure 9:
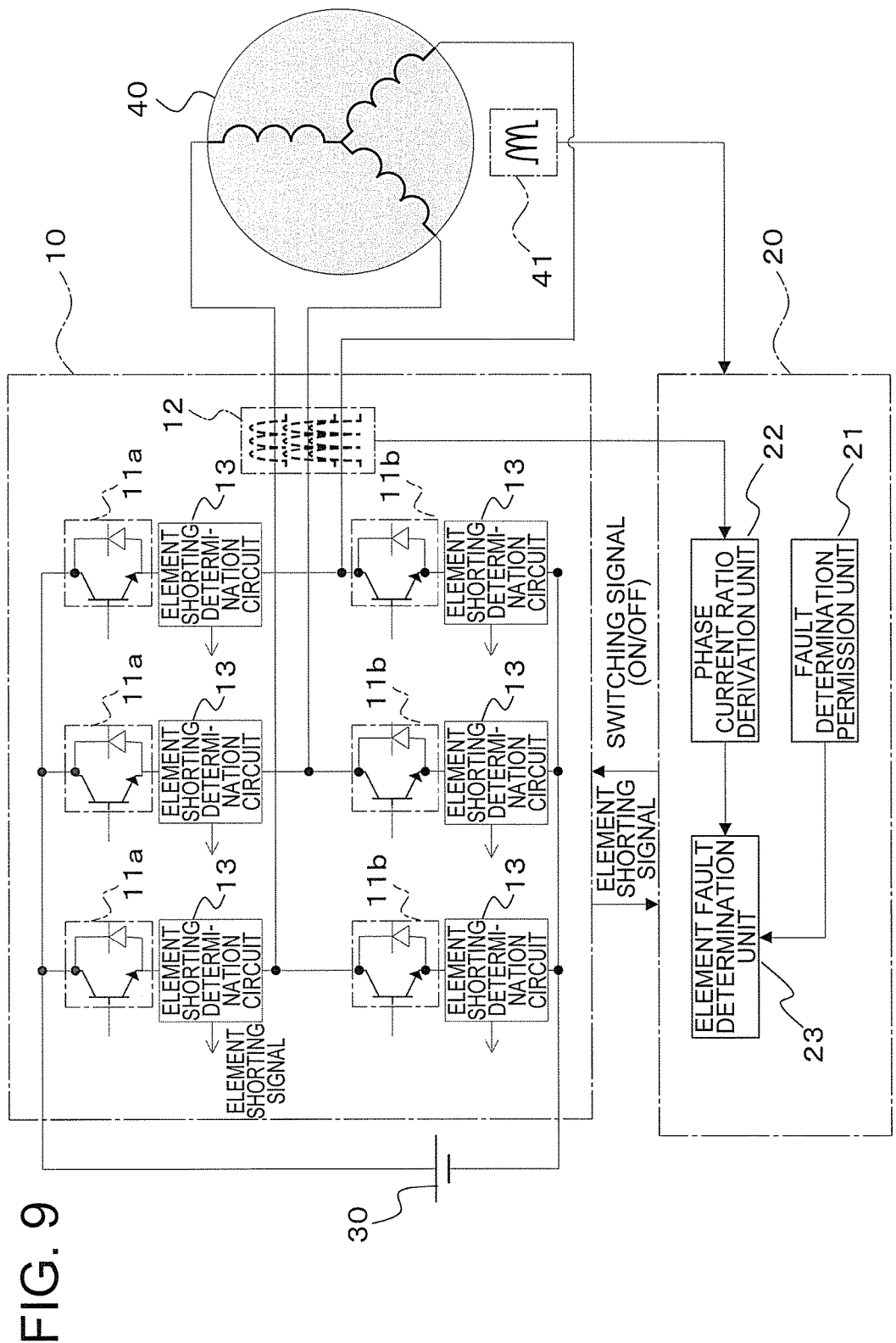
FIG. 9 is a schematic drawing illustrating a control device for a rotary electrical machine according to a second embodiment of the present invention, together with a DC power source and the rotary electrical machine.

FIG. 9 is a schematic drawing illustrating a control device for a rotary electrical machine according to a second embodiment of the present invention, together with a DC power source and the rotary electrical machine. In FIG. 9, the control device for a rotary electrical machine has element shorting determination circuits 13 which are provided respectively for each of the switching elements 11, in addition to the control device for a rotary electrical machine illustrated in FIG. 1. The remainder of the configuration is the same as FIG. 1 and therefore explanation thereof is omitted here.

The element shorting determination circuit 13 measures the element current flowing in the switching elements 11, and when the element current is equal to or greater than a previously established current threshold value, determines that shorting has occurred in a switching element 11 and outputs an element shorting signal to the inverter control unit 20.

More specifically, if element shorting has occurred, for instance, if one of the positive electrode-side switching elements 11a has a shorting fault, then a shorting current flows the instant that the negative electrode-side switching elements 11b of the same phase are switched on. When this shorting current flows, in other words, when the element current exceeds the current threshold value, then the element shorting determination circuit 13 outputs an element shorting signal.

Below, the fault determination process in the control device for a rotary electrical machine having the configuration described above is described with reference to the procedure indicated in the flowchart illustrated in FIG. 10 which shows a fault determination process in the control device for a rotary electrical machine according to the second embodiment of the invention.

Figure 10:
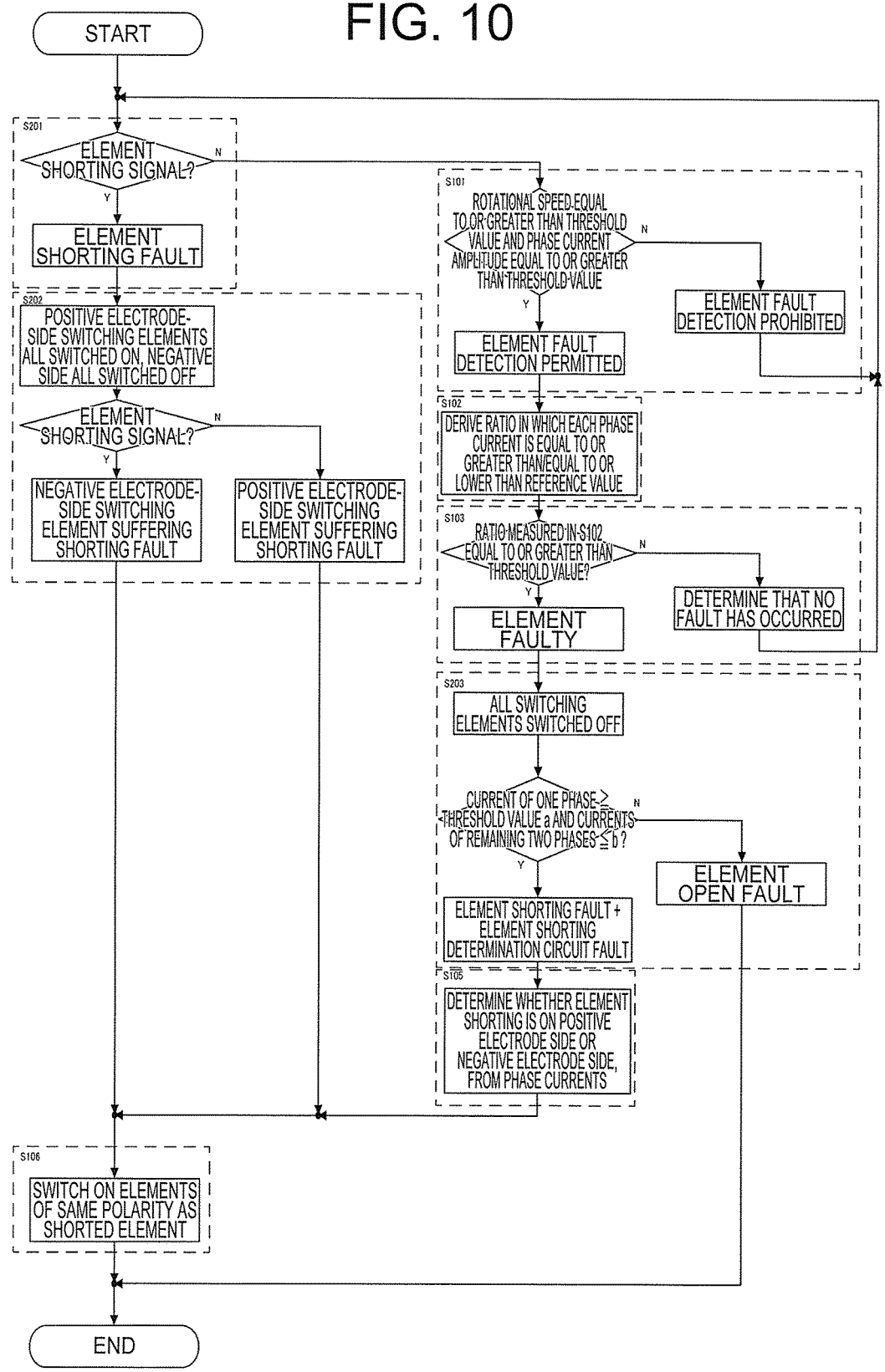
FIG. 10 is a flowchart which shows a fault determination process in the control device for the rotary electrical machine according to the second embodiment of the invention.

In FIG. 10, firstly, in step S201, the element fault determination unit 23 determines whether or not there is an element shorting signal, and if there is an element shorting signal, determines that there is an element shorting fault.

Here, if there is no element shorting signal, then the procedure transfers to the flow from step S101 onwards and determines element faults in accordance with a similar process to the first embodiment described above. In this case, the processes in step S101, step S102, step S103 and step S105 are similar to the first embodiment, and therefore description thereof is omitted here.

Step S203 is substantially the same as step S104, but when it is determined that there is an element shorting fault, it is also determined simultaneously that the element shorting determination circuit 13 has a fault.

Subsequently, when an element shorting fault is determined, in step S202, the element fault determination unit 23 determines whether the element shorting fault is on the positive electrode side or the negative electrode side. Therefore, the element fault determination unit 23 sets a three-phase shorted state by switching all of the positive electrode-side switching elements 11a on and by switching all of the negative electrode-side switching elements 11b off.

In this case, if a negative electrode-side switching element 11b is suffering a shorting fault, then a shorting current flows in the positive electrode-side switching element 11a and the negative electrode-side switching element 11b of the phase where the fault has occurred, and an element shorting signal is output. Therefore, when a three-phase shorted state occurs, the element fault determination unit 23 determines that a negative electrode-side switching element 11b has suffered a shorting fault, if there is an element shorting signal, and determines that a positive electrode-side switching element 11a has suffered a shorting fault, if there is no element shorting signal.

Next, if it is determined that the shorting fault that has occurred is on the positive electrode side or the negative electrode side, then in step S106, the element fault determination unit 23 switches on the normal switching elements 11 which are of the same polarity as the switching element 11 suffering a shorting fault. Consequently, a three-phase shorted state occurs and the current peak value decreases, as illustrated in FIG. 8.

As described above, the second embodiment is further provided with an element shorting determination circuit which measures the element current flowing in the switching elements, and when the element current is equal to or greater than a previously established current threshold value, determines that shorting has occurred in a switching element.

Therefore, it is possible to determine a shorting fault in a switching element 11 at an earlier time than the element fault determination unit 23. Furthermore, although the element shorting determination circuit 13 cannot independently determine whether it is suffering a fault itself, it is possible to determine a fault in the actual element shorting determination circuit 13 by combining with the element fault determination unit 23 which uses the phase current ratio.

Finally, in FIGS. 2A, 2B, 2C, 5, 6A, 6B, 7A, 7B and 8, some values of each horizontal axis overlap the waveforms. Therefore, we recite the values for each horizontal axis starting from the left as follows:

What is claimed is:

1. A control device for a rotary electrical machine which is connected between a DC power source and a rotary electrical machine and which controls driving of the rotary electrical machine by converting DC power from the DC power source into AC power, the control device comprising:
    a power conversion circuit which is configured from a plurality of switching elements;
    a phase current detection unit which detects phase currents in the rotary electrical machine;
    a phase current ratio derivation unit which derives a ratio of the phase currents detected by the phase current detection unit being equal to or greater than a reference value to the entire phase current detected, or being equal to or lower than the reference value to the entire phase current detected; and
    an element fault determination unit which determines a fault status of each of the switching elements when the ratio derived by the phase current ratio derivation unit is equal to or greater than a previously established ratio threshold value.

2. The control device for a rotary electrical machine according to claim 1, wherein the element fault determination unit determines a fault status of each of the switching elements at a fixed cycle.

3. The control device for a rotary electrical machine according to claim 1, further comprising a fault determination permission unit which permits fault determination by the element fault determination unit, when a rotational speed of the rotary electrical machine is equal to or greater than a previously established rotational speed threshold value.

4. The control device for a rotary electrical machine according to claim 1, further comprising a fault determination permission unit which permits fault determination by the element fault determination unit, when an amplitude of the phase currents detected by the phase current detection unit is equal to or greater than a previously established phase current amplitude threshold value.

5. The control device for a rotary electrical machine according to claim 1, wherein, when a fault status of each of the switching elements has been determined, and the power conversion circuit is a single phase circuit, the element fault determination unit determines that the fault status of the switching element is a shorting fault when, in a state where all of the switching elements are off, the phase current detected by the phase current detection unit is equal to or greater than a previously established threshold value.

6. The control device for a rotary electrical machine according to claim 1, wherein, when a fault status of each of the switching elements has been determined and the power conversion circuit is a multiple-phase circuit, the element fault determination unit determines that the fault status of the switching element is a shorting fault when, in a state where all of the switching elements are off, the phase current of any one phase, among the phase currents detected by the phase current detection unit, is equal to or greater than a previously established threshold value, and when the phase currents of the remaining phases flowing in an opposite direction to the phase current of the one phase are equal to or greater than a threshold value divided by (number of phases minus 1).

7. The control device for a rotary electrical machine according to claim 1, further comprising an element shorting determination circuit which measures an element current flowing in each of the switching elements, and when the element current is equal to or greater than a previously established current threshold value, determines that shorting has occurred in the switching element.

8. The control device for a rotary electrical machine according to claim 1, wherein, when a switching element positioned on a positive electrode side of the DC power source has a shorting fault, the element fault determination unit switches on normal switching elements which are of the same polarity as the switching element suffering the shorting fault, and when a switching element positioned on a negative electrode side of the DC power source has a shorting fault, the element fault determination unit switches on normal switching elements which are of the same polarity as the switching element suffering the shorting fault.

9. A control method for a rotary electrical machine achieved by a control device for a rotary electrical machine which is connected between a DC power source and a rotary electrical machine and which controls driving of the rotary electrical machine by converting DC power from the DC power source into AC power, the control method comprising:
    a phase current detection step for detecting phase currents in the rotary electrical machine;
    a phase current ratio derivation step for deriving a ratio of the phase currents detected in the phase current detection step being equal to or greater than a reference value to the entire phase current detected, or being equal to or lower than the reference value to the entire phase current detected; and
    an element fault determination step for determining a fault status of each of switching elements configuring a power conversion circuit when the ratio derived in the phase current ratio derivation step is equal to or greater than a previously established ratio threshold value.

* * * * *